United States Patent
Yelahanka Raghuprasad et al.

(10) Patent No.: US 12,068,946 B2
(45) Date of Patent: Aug. 20, 2024

(54) INTERPRETING NETWORK PATH STATE TRANSITIONS AND CHARACTERISTICS

(71) Applicant: Cisco Technology, Inc., San Jose, CA (US)

(72) Inventors: Mukund Yelahanka Raghuprasad, San Jose, CA (US); Jean-Philippe Vasseur, Saint Martin d'Uriage (FR); Grégory Mermoud, Venthône (CH); Petar Stupar, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/982,957

(22) Filed: Nov. 8, 2022

(65) Prior Publication Data

US 2024/0154898 A1 May 9, 2024

(51) Int. Cl.
*H04L 45/12* (2022.01)
*H04L 43/0817* (2022.01)
*H04L 45/24* (2022.01)

(52) U.S. Cl.
CPC ........ *H04L 45/123* (2013.01); *H04L 43/0817* (2013.01); *H04L 45/24* (2013.01)

(58) Field of Classification Search
CPC .... H04L 45/123; H04L 43/0817; H04L 45/24
USPC ....................................................... 709/238
See application file for complete search history.

(56) References Cited

U.S. PATENT DOCUMENTS

| 9,942,085 | B2 | 4/2018 | Tsagkaris et al. | |
|---|---|---|---|---|
| 10,643,167 | B2 | 5/2020 | Trenchard et al. | |
| 2007/0192474 | A1* | 8/2007 | Decasper | H04L 67/306 709/223 |
| 2016/0373306 | A1* | 12/2016 | Saha | H04L 41/06 |
| 2018/0109431 | A1* | 4/2018 | Sung | H04L 43/0847 |
| 2020/0382402 | A1* | 12/2020 | Kolar | H04L 43/20 |
| 2021/0152439 | A1* | 5/2021 | Soulhi | H04L 43/04 |
| 2021/0279632 | A1 | 9/2021 | Di Pietro et al. | |
| 2021/0344695 | A1* | 11/2021 | Palani | G06N 3/043 |
| 2022/0150123 | A1* | 5/2022 | Kim | G06F 16/9024 |
| 2023/0016839 | A1* | 1/2023 | Malboubi | H04L 43/14 |

OTHER PUBLICATIONS

De-La-Bandera, et al., "Feature Extraction for Dimensionality Reduction in Cellular Networks Performance Analysis", Sensors 2020, 20, 6944, Dec. 2020, 10 pages, MDPI.
Recanatesi, et al., "Predictive learning as a network mechanism for extracting low-dimensional latent space representations", Nature Communications, (2021) 12:1417, Mar. 2021, 13 pages.

* cited by examiner

*Primary Examiner* — Meng Vang
(74) *Attorney, Agent, or Firm* — BEHMKE INNOVATION GROUP LLC; James M. Behmke; James J. Wong

(57) ABSTRACT

In one embodiment, a device forms a latent space by applying dimensionality reduction to timeseries snippets of path metrics for a network path via which traffic for an online application is conveyed. The device extracts a plurality of path states from the latent space. The device presents the plurality of path states for display by a user interface. The device associates a set of transitions between the plurality of path states with the online application providing degraded application experience.

16 Claims, 14 Drawing Sheets

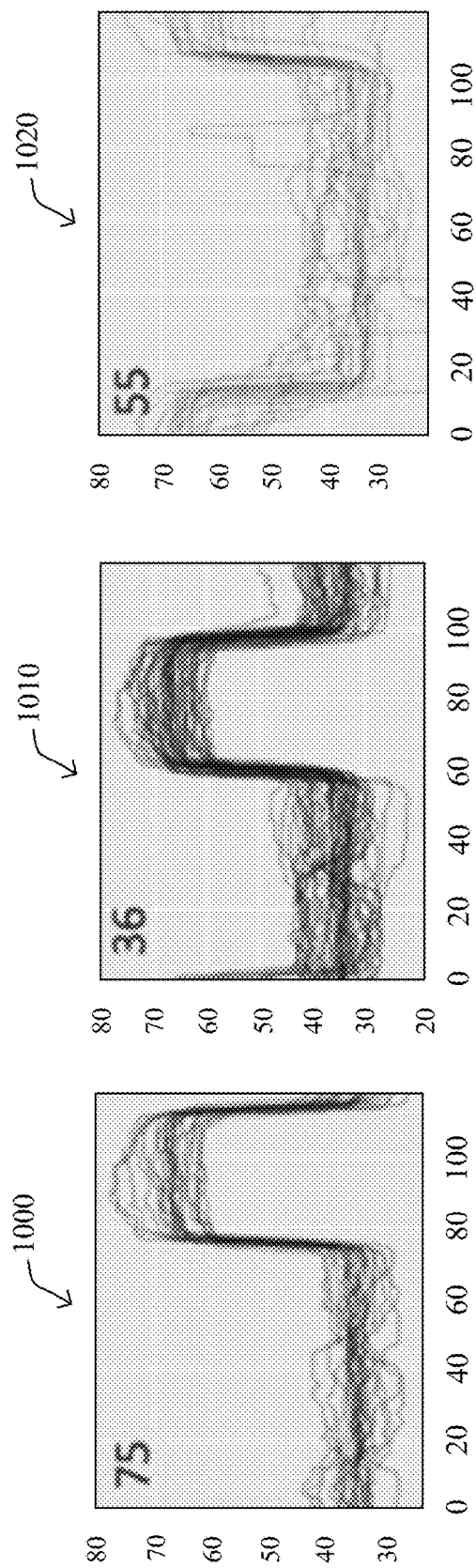
FIG. 10A
FIG. 10B
FIG. 10C
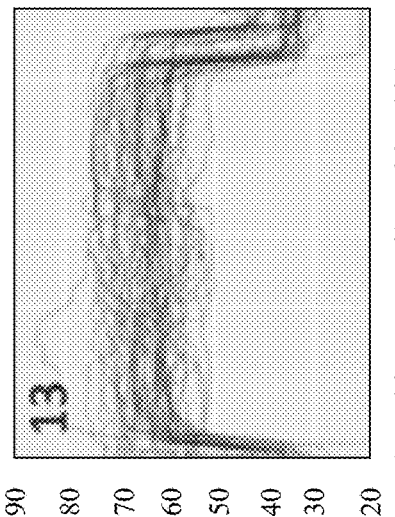
FIG. 10E
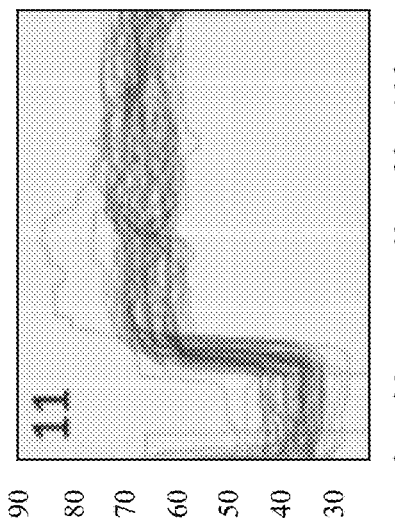
FIG. 10D

INTERPRETING NETWORK PATH STATE TRANSITIONS AND CHARACTERISTICS

TECHNICAL FIELD

The present disclosure relates generally to computer networks, and, more particularly, to interpreting network path state transitions and characteristics.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments. Moreover, such threshold-based mechanisms rely on long-standing phenomena captured by computing aggregate statistics on the network path metrics (e.g. the average delay, etc.), which is far from being able to capture all of the network path states that affect the application QoE in real-life.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 10A-10E illustrate example states of a network path; and

DESCRIPTION OF EXAMPLE EMBODIMENTS

Overview

Figure 1A:
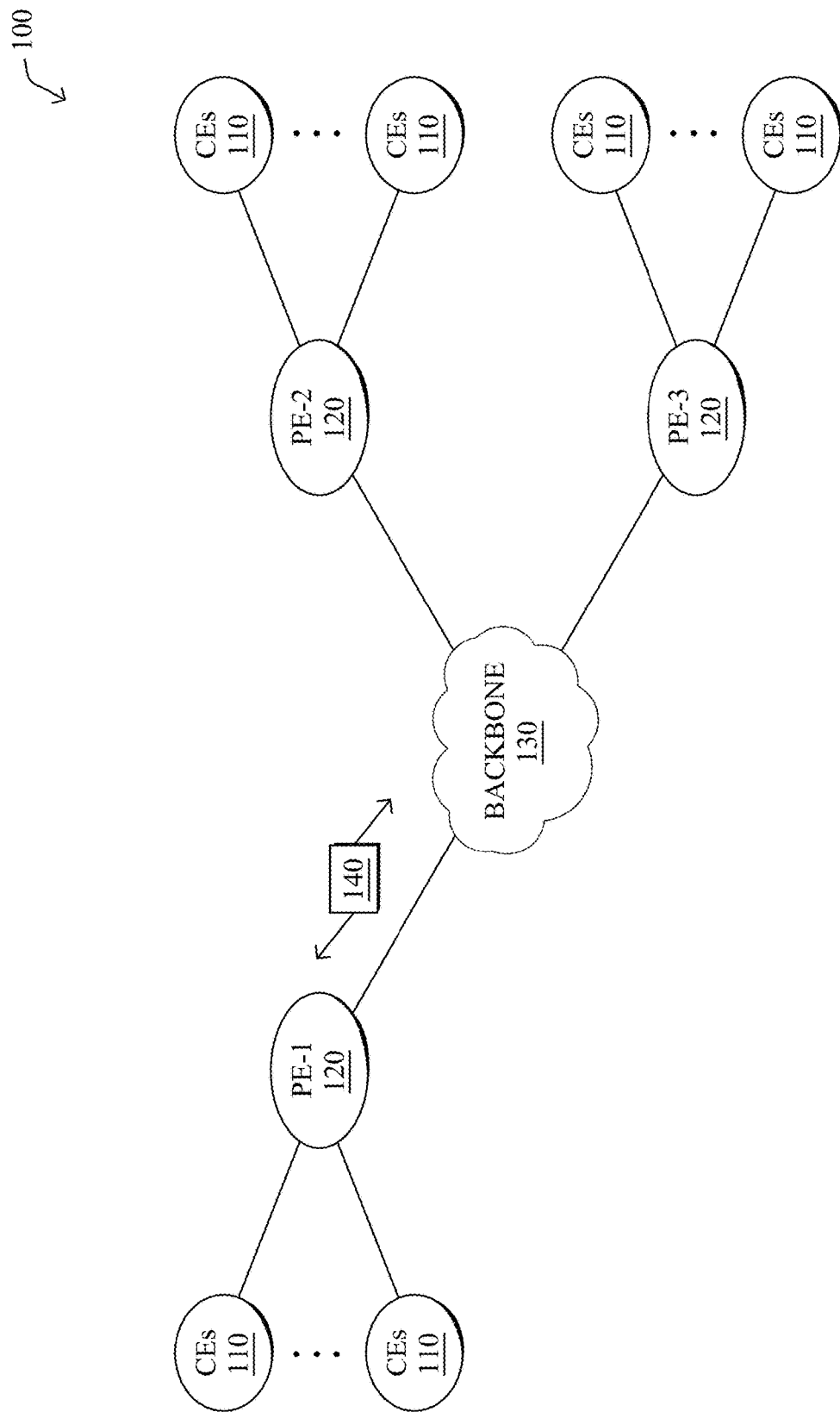
FIGS. 1A-1B illustrate an example communication network.

According to one or more embodiments of the disclosure, a device forms a latent space by applying dimensionality reduction to timeseries snippets of path metrics for a network path via which traffic for an online application is conveyed. The device extracts a plurality of path states from the latent space. The device presents the plurality of path states for display by a user interface. The device associates a set of transitions between the plurality of path states with the online application providing degraded application experience.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
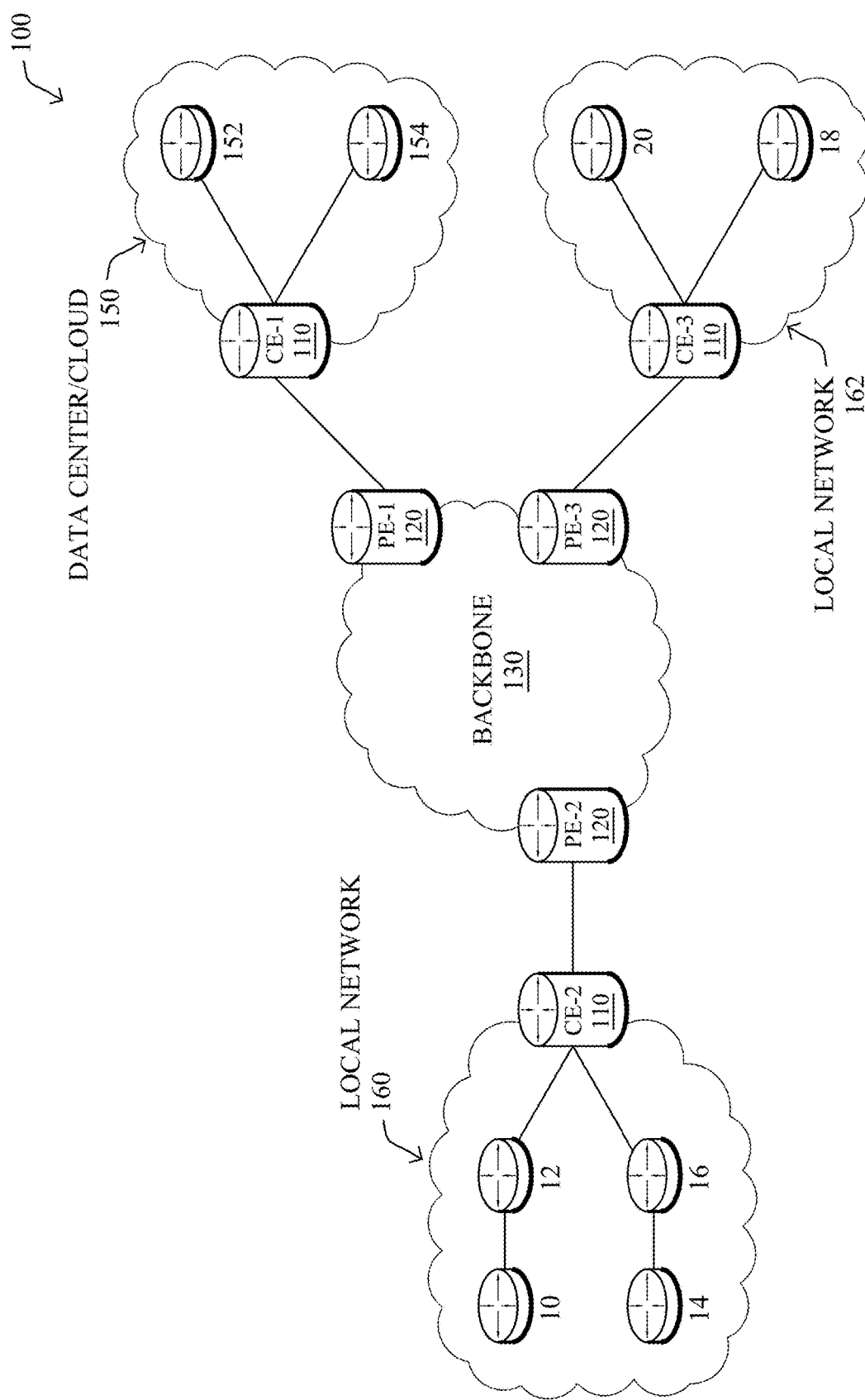

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
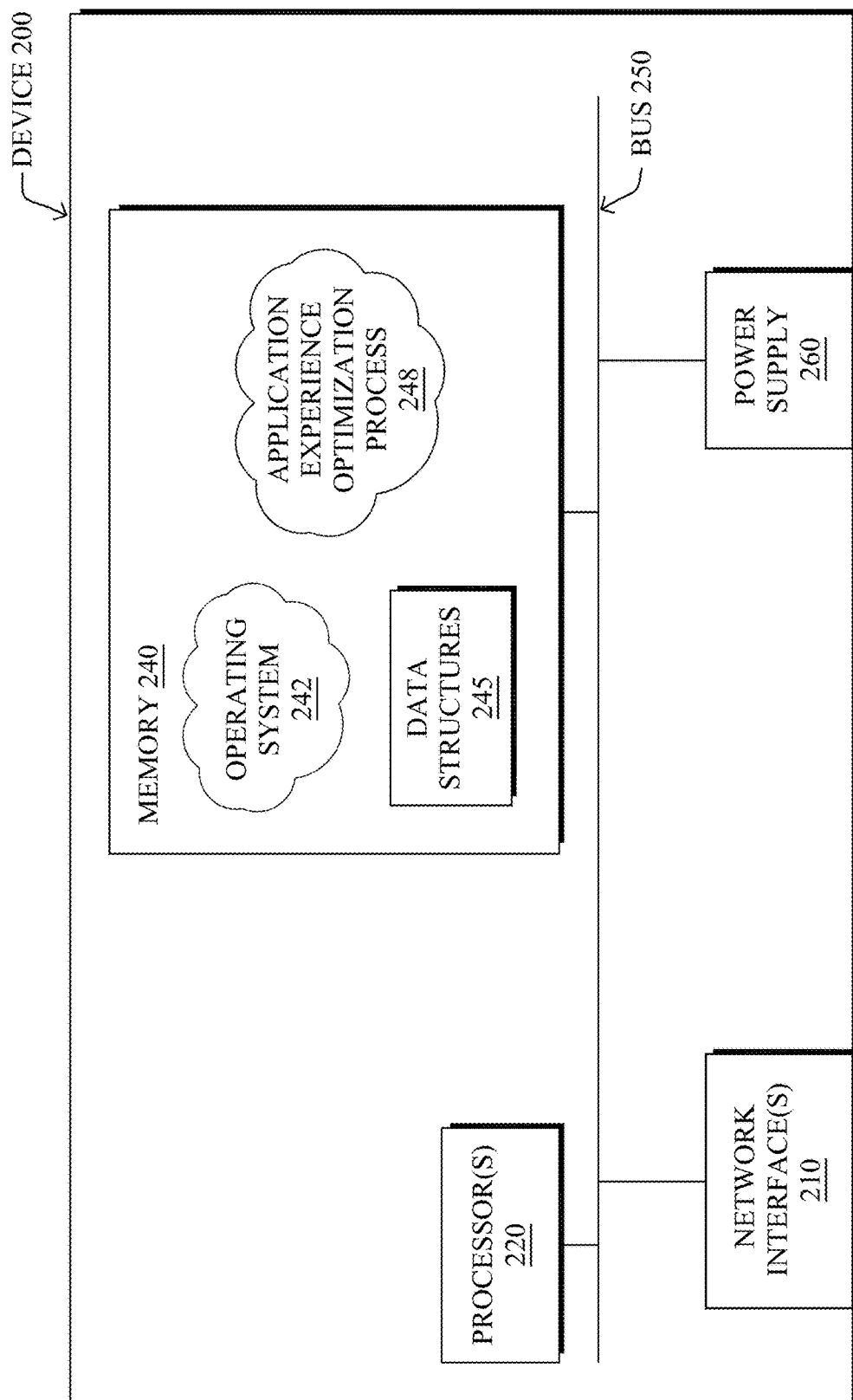
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
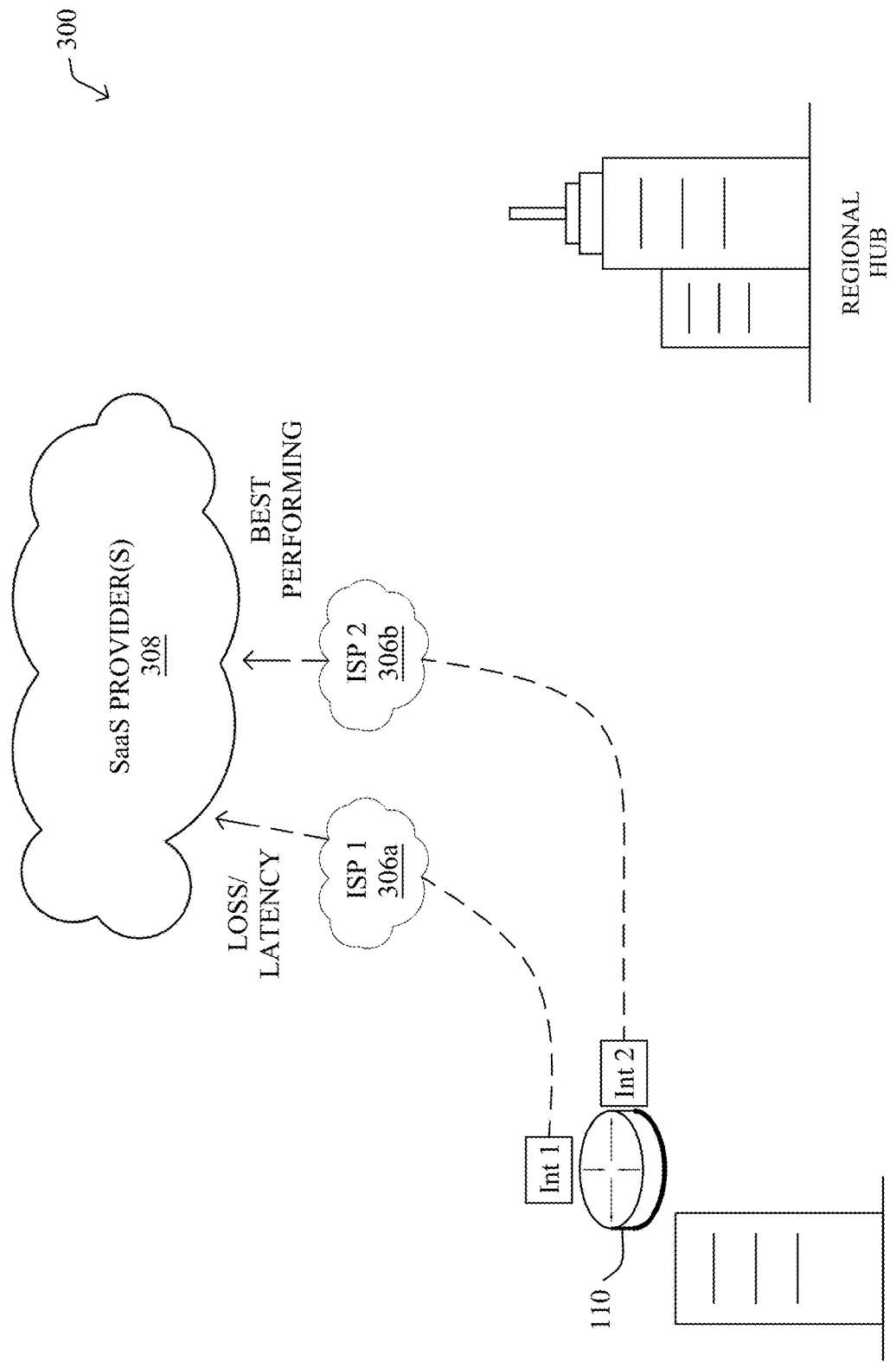
FIGS. 3A-3B illustrate example network deployments.
Figure 3B:
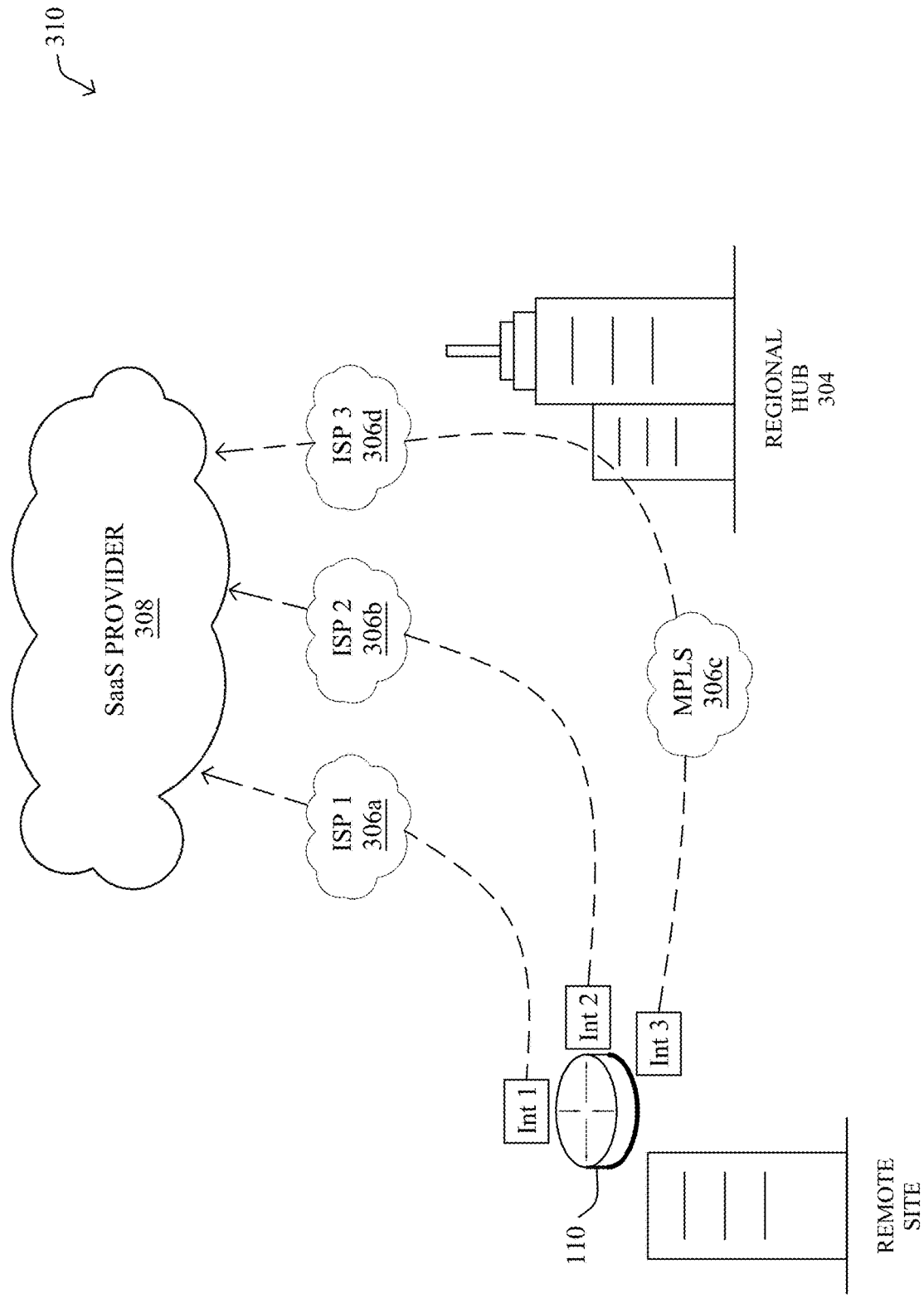

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
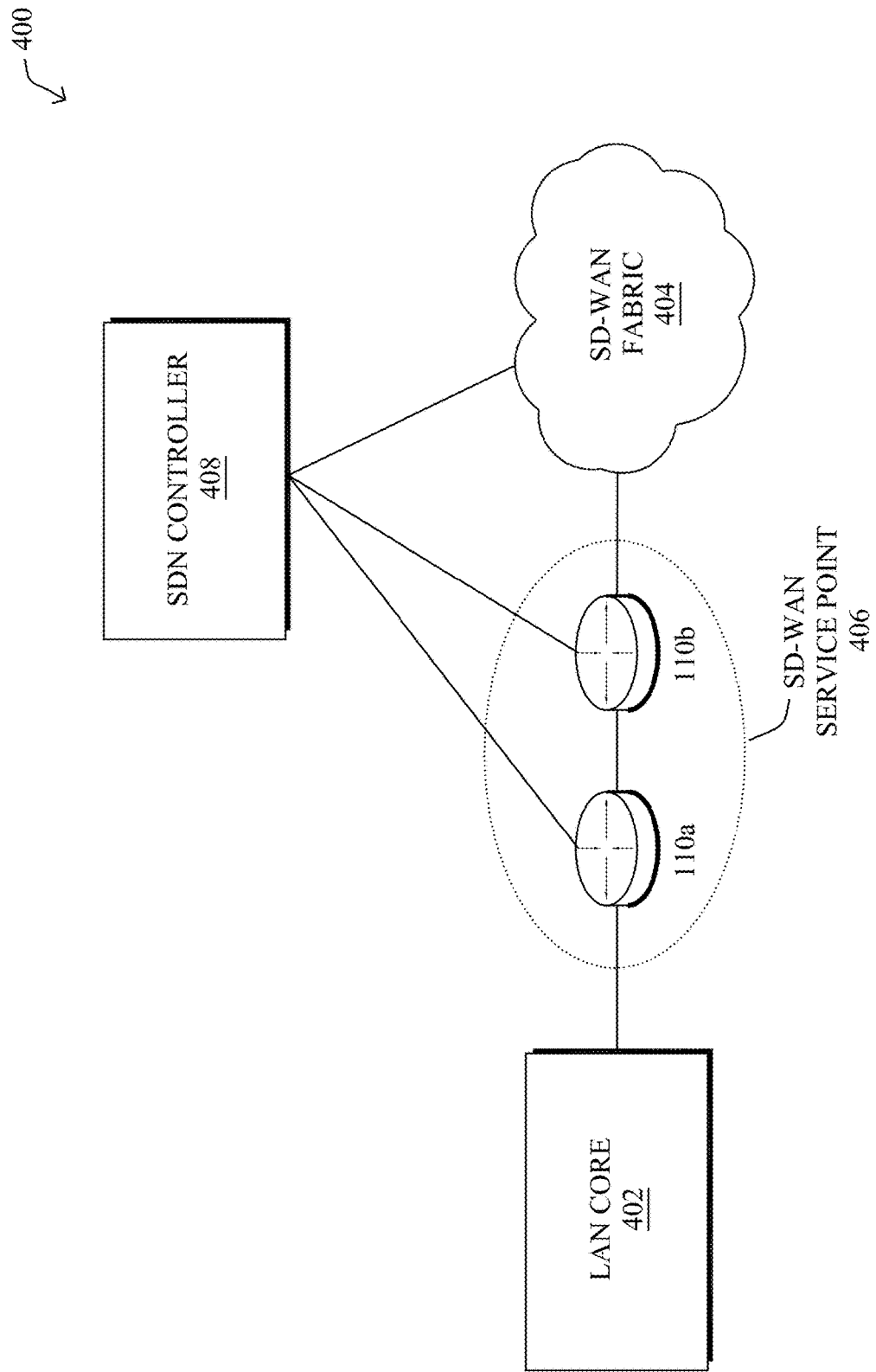
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in t e network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
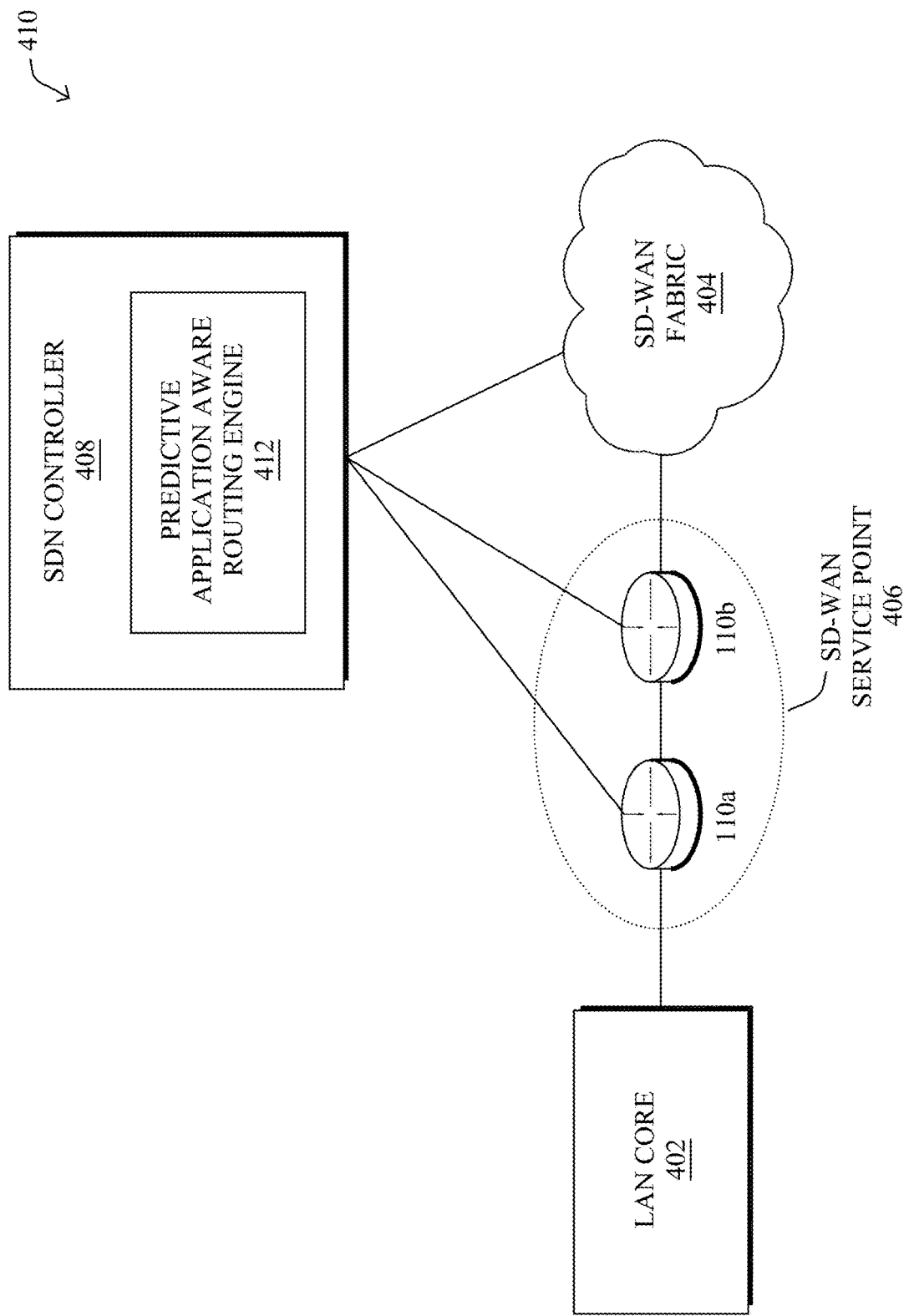

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110h, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, advances in machine learning now make it possible to predict when the QoE of an application will be degraded, based on the states of the network path(s) via which traffic of the application is conveyed. Testing has revealed that these states can persist over a certain time interval (e.g., across multiple timestamps/data points). For example, consider a path metric timeseries whereby the metric is slowly increasing/decreasing in value, or where the value of the metric is extremely noisy. Such states spanning over a time interval can be leading indicators for poor application QoE.

Thus, it is important to consider not just a single datapoint of the path metric, but a time window of values while characterizing the states for that, metric. Furthermore, there are circumstances where a limited number of states cannot be easily detected in the original space of the metric (e.g., delay, jitter, loss, etc.) due to noise/complexity, but can be detected in a latent space after complex dimensionality reduction, in some embodiments. Such a latent space, however, may be more complex to interpret, which may be critical to predicting degraded QoE. Both the interdependencies of the different metrics, as well as the time window-based states, face what is known as the "curse of dimensionality," whereby certain phenomena make the analysis of high-dimensional data particularly challenging, when compared to low-dimensional data. Indeed, the task of defining states over multiple types of metrics and/or multiple timestamps is a complex task and often increases the number of states.

Interpreting Network Path State Transitions and Characteristics

The techniques introduced herein help to model the dynamics of a network in an interpretable manner. In some aspects, to account for the high dimensionality of the different path metrics collected from the network, the techniques herein apply dimensionality reduction to the metrics, to reduce the original set of metrics into a latent space. From there, the system extracts distinct network behaviors from different regions of this latent space and tags them with labels regarding their effects on the QoE of a given application (e.g., "critical," "interesting," etc.). Here, a "critical" state could represent a state associated with degraded application QoE, for instance. In further aspects, the techniques herein also introduce mechanism to extract contextual information regarding critical/interesting states, including state transition models that may be used to make predictions.

Illustratively, the techniques described herein may be performed by hardware, software, and/or firmware, such as in application experience optimization process 248, which may include computer executable instructions executed by the processor 220 (or is independent processor of interfaces 210) to perform functions relating to the techniques described herein.

Specifically, according to various embodiments, a device forms a latent space by applying dimensionality reduction to timeseries snippets of path metrics for a network path via which traffic for an online application is conveyed. The device extracts a plurality of path states from the latent space. The device presents the plurality of path states for display by a user interface. The device associates a set of transitions between the plurality of path states with the online application providing degraded application experience.

Figure 5:
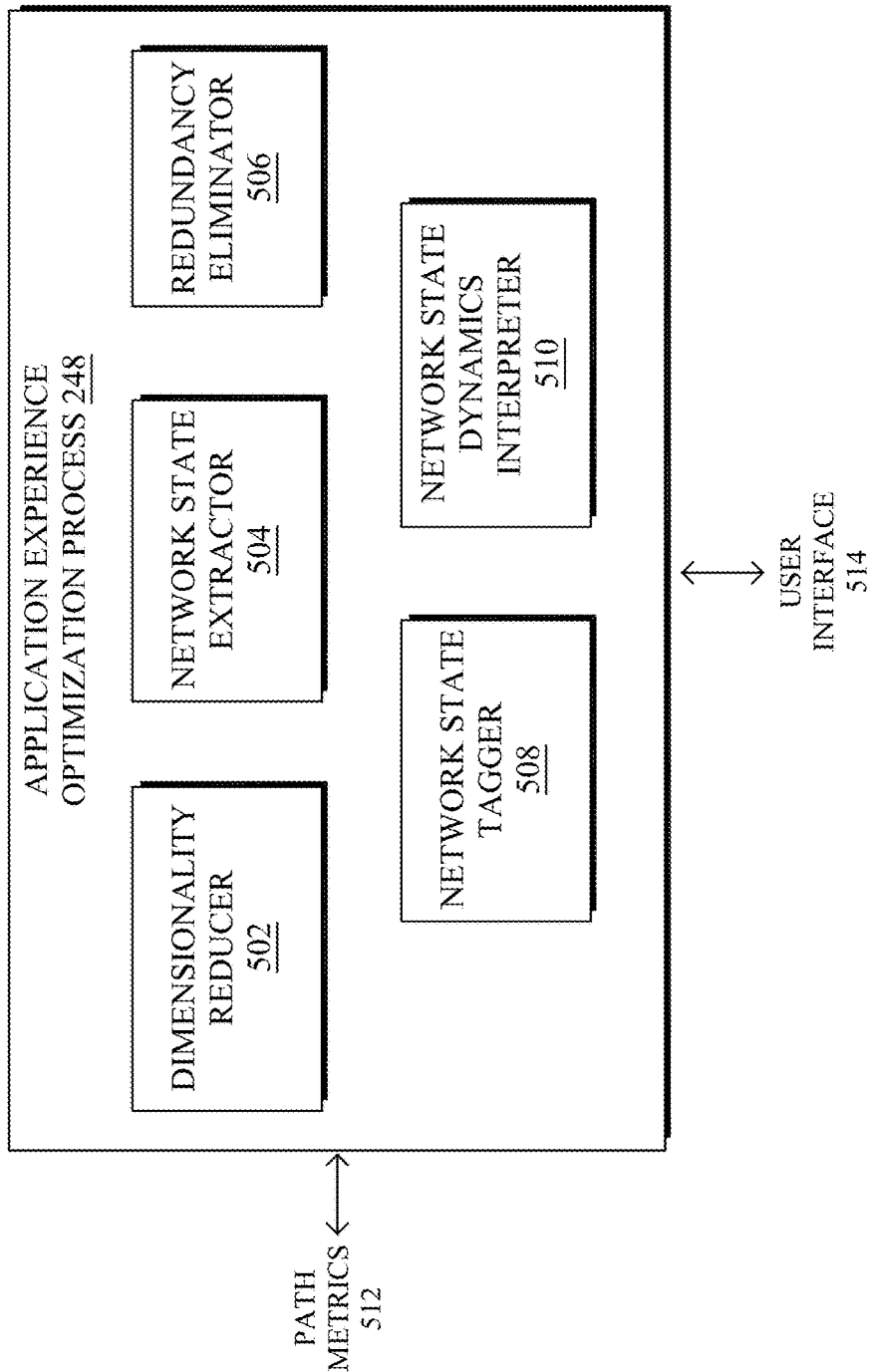
FIG. 5 illustrates an example architecture for interpreting network path state transitions and characteristics.

Operationally, FIG. 5 illustrates an example architecture for interpreting network path state transitions and characteristics, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all is of the following components: a dimensionality reducer 502, a network state extractor 504, a redundancy eliminator 506, a network state tagger 508, and/or a network state dynamics interpreter 510. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During execution, application experience optimization process 248 may operate in conjunction with any number of telemetry collection mechanisms, to obtain path metrics 512 regarding the various network paths (e.g., DIA paths, tunnels, etc.), the online applications themselves, or the like.

For instance, path metrics 512 may be obtained by sending probes along the various paths/tunnels, such as Bidirectional Forwarding Detection (BFD) or CXP probes, that indicate path metrics such as loss, latency, jitter, throughput, etc. Netflow or IPFIX records represent another potential source of the telemetry data.

In some embodiments, application experience optimization process 248 may also obtain telemetry data from the online application(s) under consideration, such as via an application programming interface (API). For instance, application experience optimization process 248 may obtain application experience metrics (e.g., QoE metrics) as a continuous number or a discrete value (e.g., 'good' 'bad,' 'no opinion,' etc.), or multiple such metrics. Examples of such application experience metrics may also include metrics based on satisfaction rations provided by users of the application, such as by having the users complete satisfaction surveys during or after their application sessions.

Such surveys may be presented either via a local agent or directly within the application itself. Other forms of experience metrics from the application itself could also include any other Layer 7 metric, as well, such as mean opinion scores (MOS), etc.

In various embodiments, dimensionality reducer 502 takes in as input all of the is path metrics 512 for a given network path (e.g., N-number of dimensions of metrics) and outputs the corresponding latent space representation (M-number of dimensions, where M<N). The input to dimensionality reducer 502 may be values for N-number of different path metrics 512 at given timestamp (where each timestamp corresponds to a data point), the values of the same metric over a time window comprising of N-number timestamps, or both whereby it assesses multiple path metrics 512 over a time window rather than a single timestamp. In some instance, a user may control which approach dimensionality reducer 502 takes by setting one or more parameters via a user interface 514.

In terms of the architecture of dimensionality reducer 502, in one embodiment, it may comprise a dimensionality-reduction model that is trained over a certain history of the network path. The length of the history determines the network behaviors that would be considered relevant by the system and further defined as network states. The model can also be updated regularly to reflect the changes in network behavior for the path. In various cases, the dimensionality reduction of incoming data can either happen on-the-fly or through a batch processing approach, as desired. Moreover, the model may be updated upon the detection of specific events in the networks (e.g., a change of topology, traffic matrix, or other change) that is subject to impacting the states observed in the network.

Dimensionality reducer 502 may employ any number of suitable analysis approaches such as, but not limited to, Principal Component Analysis (PCA), t-Stochastic Neighborhood Estimation (t-SNE), Uniform Manifold Approximation and Projection (UMAP), etc. In some embodiments, dimensionality reducer 502 could also employ Deep Neural Network (DNN) architectures such as Autoencoders, Variational Autoencoders, etc., to arrive at a latent space representation for a given set of N-dimensional input states.

Figure 6A:
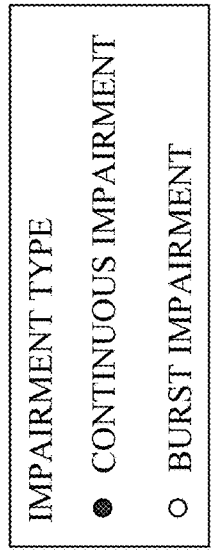
FIGS. 6A-6B illustrate examples of latent spaces.
Figure 6A:
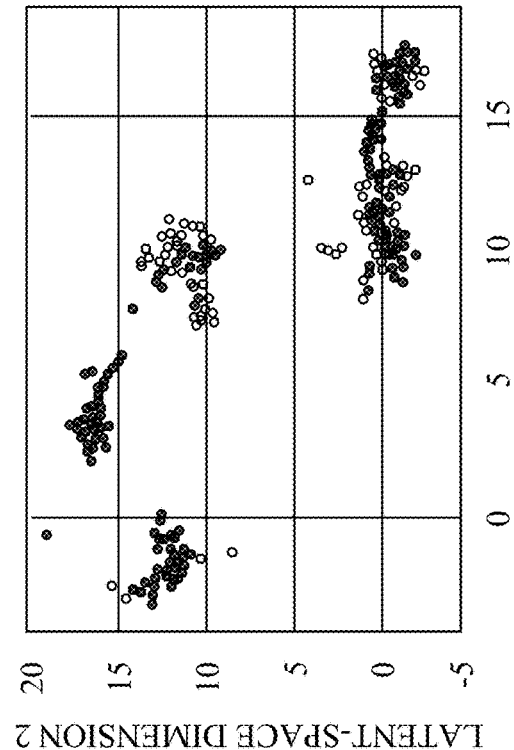
Figure 6B:
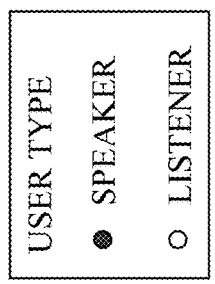
Figure 6B:
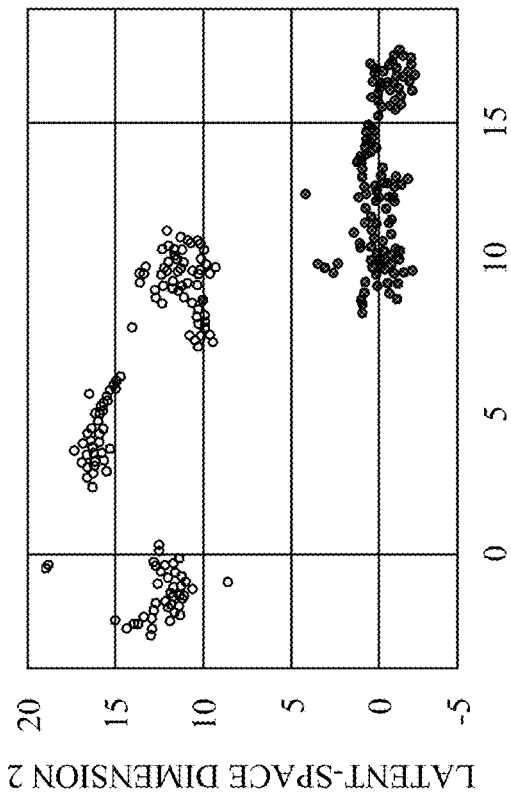

By way of example, consider the telemetry from a video-communication system, such as WebEx. The telemetry corresponds to a two-user WebEx call, where one of the users is a speaker and the other is a listener. The telemetry for the call is also multi-dimensional and available for both users containing both network-level and application-is level metrics. Reducing the dimensionality of the telemetry to only dimensions using UMAP gives the latent space representations 600, 610 in plots 600-610 in FIGS. 6A-6B, respectively. As shown in FIG. 6A, the different types of users (i.e., 'speaker' and 'listener') are denoted, while in FIG. 6B, the different types of network impairments (i.e., 'continuous' and 'burst') are shown for the same datapoints in the latent space.

One can observe that latent space representation 600 captures the distinction between the telemetries that correspond to the two users extremely well by placing the telemetry that corresponds to each of the user in significantly different latent space regions. Similarly, in latent space representation 610, one can observe that the latent space also captures the two types of network behavior whereby continuous and burst impairments in the network are represented in different regions. From this, it can be seen that there is an interdependency of metrics, as well as the concept of different users and impairment types, none of which is explicitly provided in the input data, but can still be captured well through dimensionality reduction. Such a clean representation in the latent space can be useful for various purposes, such as prediction, as detailed below.

In another example embodiment, consider the latency for a given network path, whereby a network state is defined over a given time interval. Each measurement of its path metrics 512 may have an associated timestamp indicating when the measurement was taken. In such a case, the collection of measurements for each of the path metrics 512 results in the formation of a distinct timeseries for that metric (e.g., a series of packet loss metrics over time, etc.). Now, applying a set time window to any of these timeseries, individually or in combination with one another, will yield what are referred to herein as timeseries 'snippets.' In turn, dimensionality reducer 502 may reduce the timeseries snippets to a lower number of dimensions (e.g., two dimensions for purposes of explaining the techniques herein) such that time intervals exhibiting different behaviors are encoded in different latent space regions. By way of illustration, FIG. 7 illustrates an example diagram 700 showing the formation of a latent space from timeseries snippets in this manner.

Figure 7:
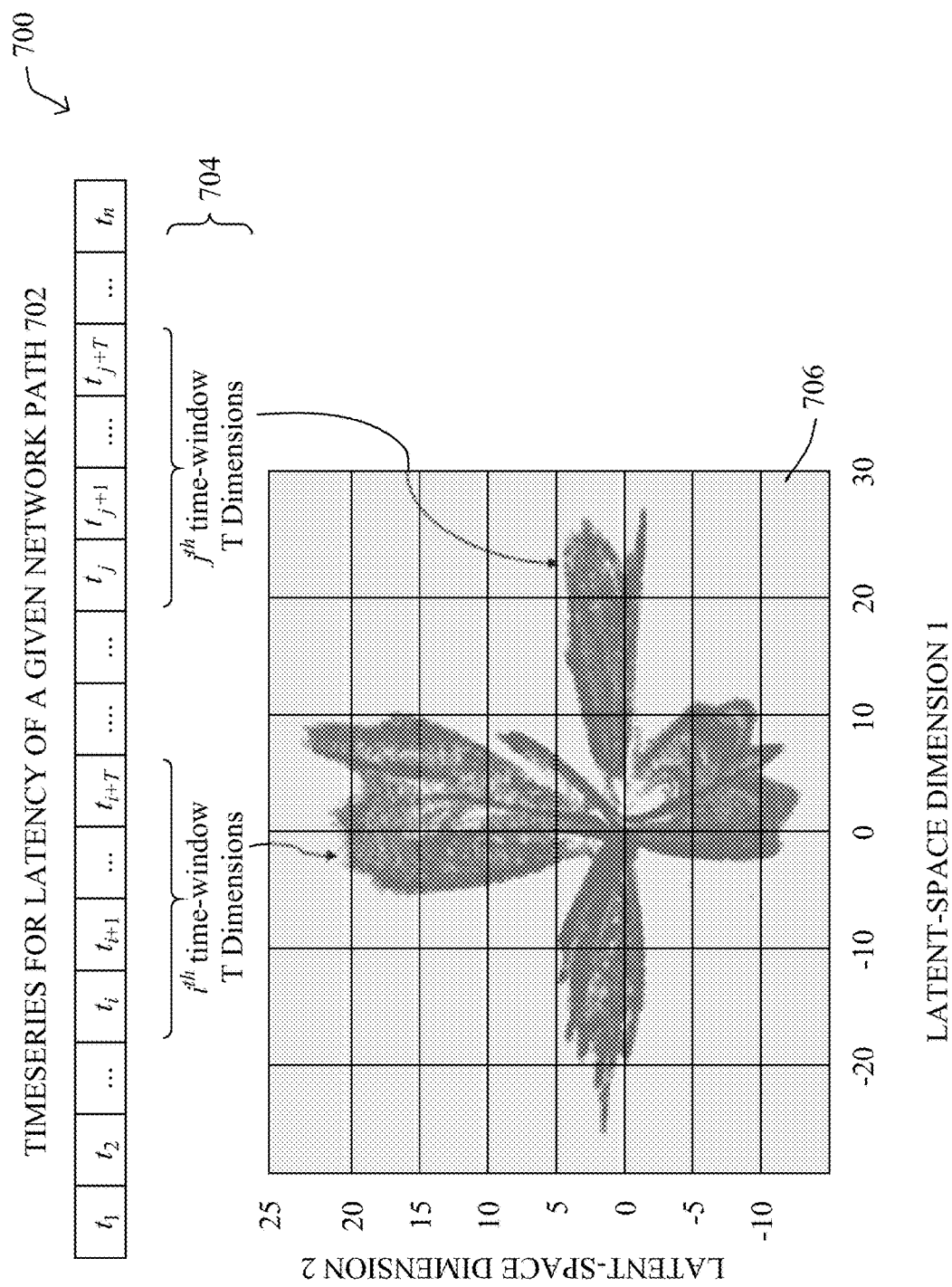
FIG. 7 illustrates an example diagram showing the formation of a latent space from timeseries snippets.

As shown in FIG. 7, assume that there are one or more timeseries 702 with each measurement having an associated timestamp t. By applying sliding time windows 704 to the timeseries 702, T-dimensional sets of metrics can be extracted by dimensionality reducer 502 and reduced into a two-dimensional latent space 706. Here, depending on the dimensionality reduction approach used by dimensionality reducer 502, each latent space region characterizes a certain "pattern" or a certain "behavior" that is prevalent in the network path. If the path exhibits these behaviors regularly one would observe that the latent space values for the path would also oscillate between the different regions that correspond to the different network behaviors. Such trajectories allow for capturing a small number of states between which the network oscillates. The latent space regions which the path visits frequently can also be defined as a "network state," as described below, and the latent space can then be divided into different states. Note that such a state may not be interpretable but could still be used for purposes of predicting degraded application experience.

Referring again to FIG. 5, network state extractor 504 may be configured to take as input the latent space values for a given path from dimensionality reducer 502, over a given time-range, and extracts as output the network states that are defined by the latent space, according to various embodiments. In one embodiment, network state extractor 504 may identify these states by applying clustering to the latent space values by identifying high density regions in the latent space that represents a certain prevalent network behavior.

In another embodiment, network state extractor 504 may also leverage user input from user interface 514 to define the network states based on the latent space distribution of points. Here, the user may define the boundaries of the latent space that could constitute a network state. Further embodiments provide for network state extractor 504 to take a hybrid approach whereby it still performs clustering on the latent space values, but also relies on user input to fine tune the boundaries representing network states. An example for this would be if two network states defined by latent space regions are very is close to each other. If the user finds that these two regions represent very similar network aspects, the two clusters could be collapsed into a single cluster. To that end, network state extractor 504 may present each cluster for display via user interface 514, to help the user define the relevant state. In addition, network state extractor 504 may also present contextual information about the cluster, as well, such as the amount of time the path remained in that cluster, the distribution of the path metrics 512 (e.g., a box plot showing the distribution of delay, etc.), or the like.

Apart from defining the network state, network state extractor 504 may also interpret the clusters in terms of original path metrics 512, in some embodiments. For example, consider network states defined by two different regions where, once analyzed, the two regions can be interpreted as different distributions of a certain metric (e.g., different ranges of latency) or a categorical variable (e.g., different service providers). Such interpretations of the clusters can be generated by network state extractor 504, automatically, which further aids a user to interpret the network states via user interface 514. In one embodiment, such differences can be identified by network state extractor 504 measuring the homogeneity/heterogeneity of the original path metrics 512 for two or more clusters. In further embodiments, network state extractor 504 may make use of interpretability techniques.

Figure 8:
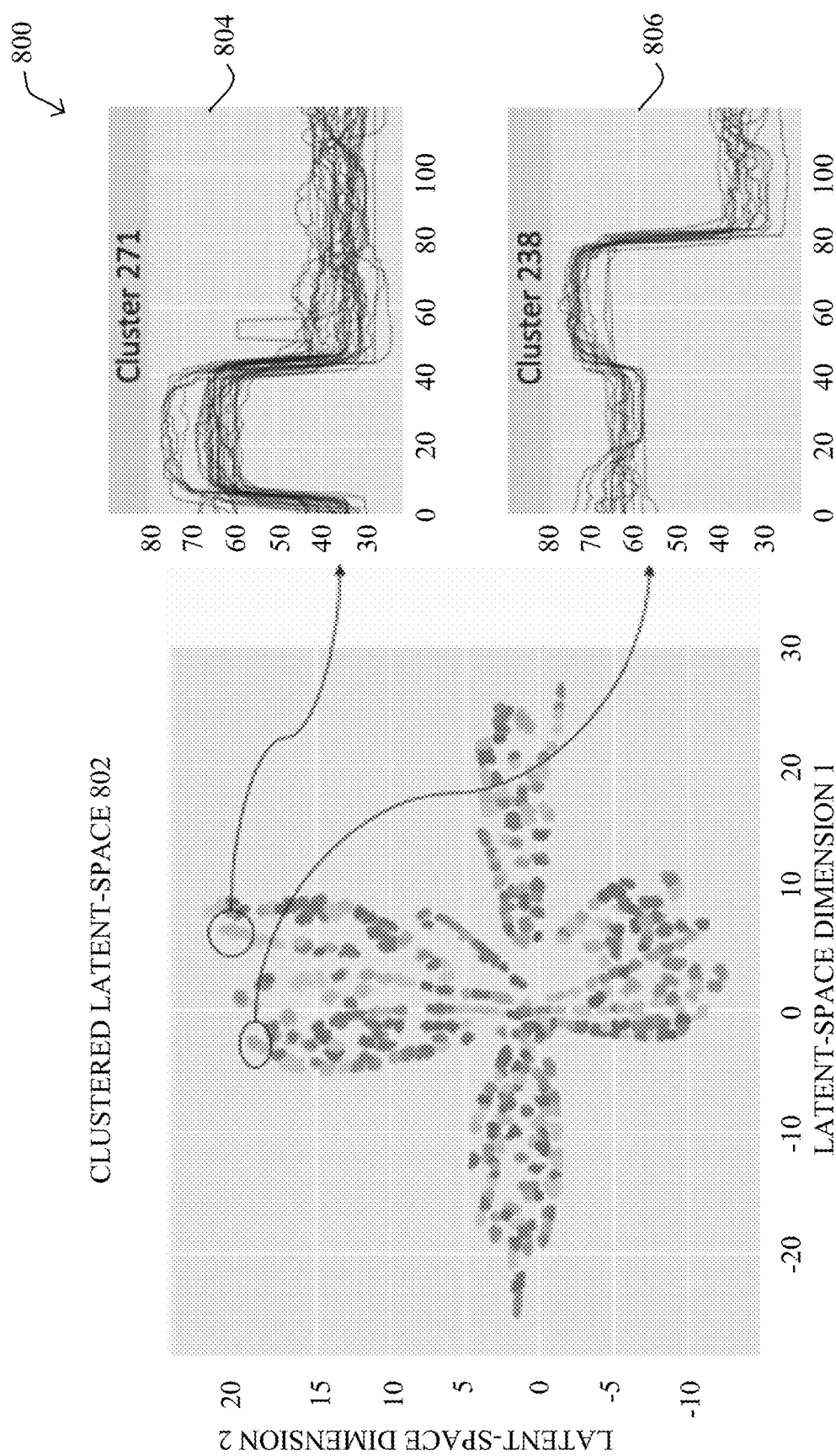
FIG. 8 illustrates an example of the extraction of states from a clustered latent space.

For purposes of illustration, FIG. 8 illustrates an example 800 of the extraction of states from a clustered latent space 802. As noted, different regions of the latent space 802 may exhibit different network behaviors. One can observe that two unique clusters, such as clusters 804 and 806, encoded in two different latent space regions of clustered latent space 802 capture two-different types of behavior observed in the timeseries. A given cluster contains all occurrences of a particular behavior that is observed for a path. Each of these clusters can thus be defined as a network state that represents a particular network behavior repeated over time.

Referring again to FIG. 5, in another embodiment when the dimensionality reduction by dimensionality reducer 502 is performed on-the-fly, network states could be defined over explicit network events like system failures which can be identified through is system logs. Such latent space regions that correspond to a logged system failure can then act as a reference/seed for any other telemetry that occurs in its vicinity. The latent space region and any telemetry that is encoded in that region can then be said to be associated a network state that defines a system failure. States can thus be created for various such interpretable network events that may or may not be critical in nature.

In various embodiments, redundancy eliminator 506 may take as input the network states and their interpretations inferred from network state extractor 504 and gives as output a smaller set of states that is not redundant in terms of the network behavior represented by it. To do so, redundancy eliminator 506 may either collapse two states that are very similar in network behavior into a single state or by removing states that are simply noisy and do not contain any information. The extent of eliminating such redundancy can also be decided by a user via user interface 514, in some instances.

In various embodiments, network state tagger 508 may be configured to tag certain network states from network state extractor 504 and/or redundancy eliminator 506 as interesting/critical to a given use case. The tagging can be done by network state tagger 508 automatically by taking as input certain conditions/rules that constitute a critical state, such as, SLA failures, MOS score degradation etc. In other embodiments, network state tagger 508 may rely on user expertise via user interface 514 to perform the tagging. In such a case, the user of user interface 514 may be presented with information that corresponds to each network state of interest such as the distribution of QoE metrics, the distribution of network entities (e.g., service providers, network devices, etc.), etc., to assist the user in determining the effect of the network behavior on the user experience. In one embodiment, the user can tag critical states as those which represent network behavior causing a degradation in the application experience. In some cases, the user can also tag a given state as an early sign, if the state represents network behavior that could serve as an early indicator for degradation.

Figure 9:
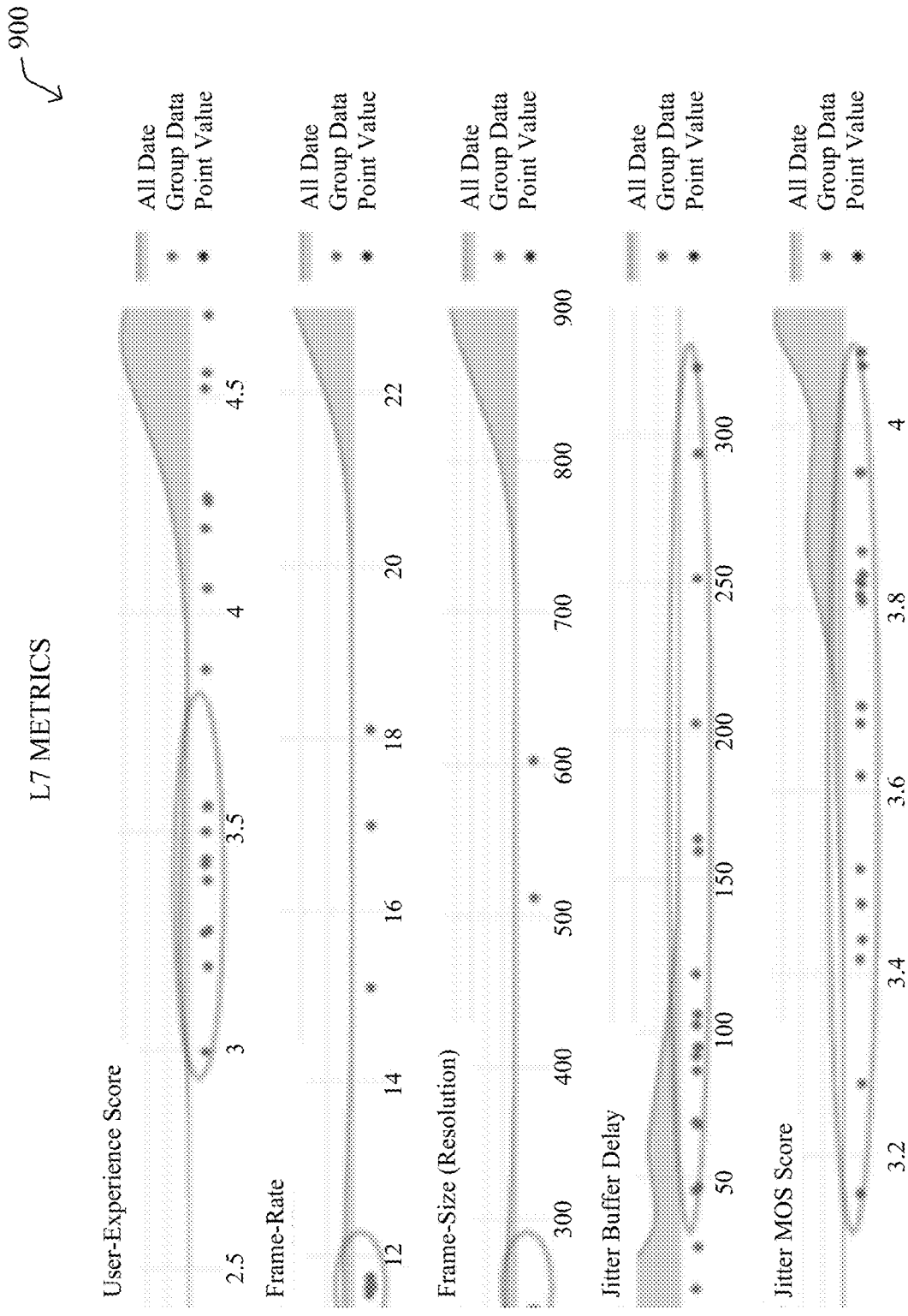
FIG. 9 illustrates an example display of different metrics on a user interface.

FIG. 9 illustrates an example display of different metrics on a user interface, in various embodiments. For instance, network state tagger 508 may present display data 900 to user interface 514, to show the user the distributions of the application experience/QoE metrics corresponding to a certain network state. Critical states are marked with dots below the general distributions/density plots for the various metrics.

Referring yet again to FIG. 5, network state dynamics interpreter 510 may take as input all the states defined by the other components of application experience optimization process 248 and can give as output the following, any or all of the following:

State Transition Discovery Data: The set of significant transitions between the network states or the significant transitions to a given set of critical states.

Rule Discovery Data: The set of rules or network conditions that accompany a user-defined "critical" condition. An example for a "critical" condition can be degraded application experience and the network conditions can be defined in terms of the original path metrics 512.

Knowledge Graph Data: The creation of a knowledge graph that can contain the different ranges of values seen for the input set of path metrics 512 and other properties like co-occurrences, correlations, dependency relations between path metrics 512, etc.

For the tasks of transition discovery and rule discovery, network state dynamics interpreter 510 may take in as input the set of critical states defined by network state tagger 508. Considering the network states and the timeseries nature of the data, a path-transition model can be constructed that represents the movement of the path from one state to the other. The path-discovery task then involves identifying the important paths that lead to the critical states. In one embodiment, network state dynamics interpreter 510 may simply list the paths that lead to a critical state ranked by the probability of occurrence or the statistical significance of the path.

The rule-discovery task may involve formalizing the network context of a critical/interesting network state through rules based on path metrics 512. In one of the embodiments, where a critical state represents degraded application experience, network is state dynamics interpreter 510 can help identify the network context associated with that network state. For instance, network paths may be more susceptible to providing degraded application experience when connected to a particular service provider or when connected to a particular server of a SaaS provider. Such information could be presented for display by network state dynamics interpreter 510 via user interface 514.

All the outputs of network state dynamics interpreter 510 may be presented via user interface 514 for review by the administrator/user. These outputs can also be used to drive predictions for purposes of routing the application traffic, as described previously. In addition, network state dynamics interpreter 510 may also garner feedback via user interface 514 from the user as to which paths/rules discovered are relevant or redundant and then perform updates to the system.

In one embodiment, a state transition model can be constructed by network state dynamics interpreter 510 to track the dynamics between the states and thus perform discovery. FIGS. 10A-10E illustrate example states of a network path that that constitute such transitions. More specifically, a given network path may transitions between states 1000-1040 shown in FIGS. 10A-10E. From this, it can be seen that the path almost always exhibits a spike in latency that lasts for about 45-50 seconds after a spike in latency that last for 15 seconds. This long-interval spike in latency occurs after about 30-seconds the initial short-interval spike. Considering that long-interval spike in latency can have a worse impact on the application experience, the short-interval spike can act as an early indicator for the long-interval spike. Such information can be used by application experience optimization process 248 to then redirect the traffic away from the path, whenever it encounters a short-interval latency spike as a precaution against a long-interval disruption to the application experience.

Figure 11:
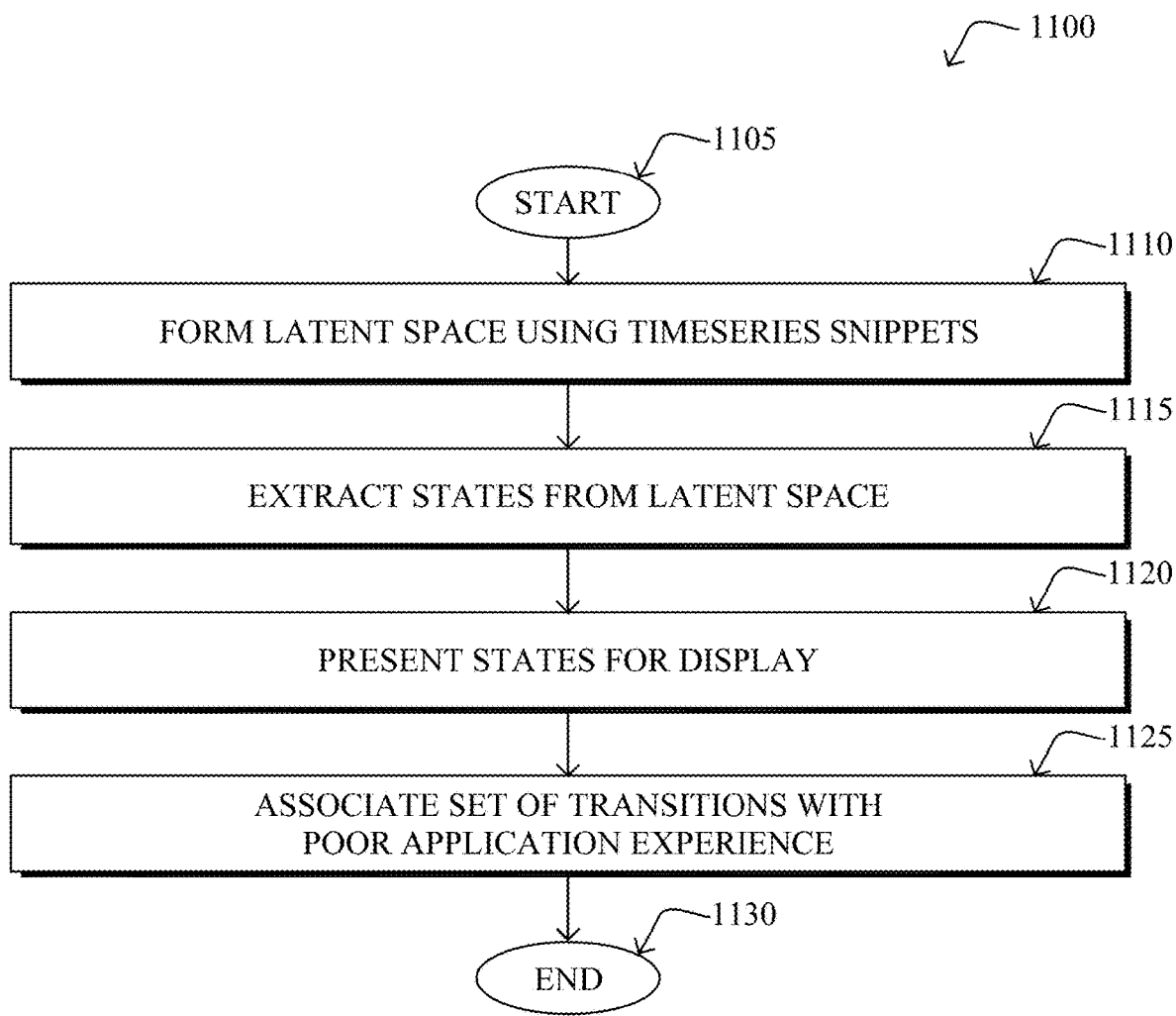
FIG. 11 illustrates an example simplified procedure for interpreting network path state transitions and characteristics.

FIG. 11 illustrates an example simplified procedure 1100 (e.g., a method) for interpreting network path state transitions and characteristics, in accordance with one or more embodiments described herein. For example, a non-generic, specifically configured device (e.g., device 200), such as controller for a network (e.g., an SDN controller, a is cloud-based device, etc.), an edge router, or other device in communication therewith, may perform procedure 1100 by executing stored instructions (e.g., application experience optimization process 248). The procedure 1100 may start at step 1105, and continues to step 1110, where, as described in greater detail above, the device may form a latent space by applying dimensionality reduction to timeseries snippets of path metrics for a network path via which traffic for an online application is conveyed. In various embodiments, the path metrics comprise at least one of: packet loss, jitter, delay, or throughput. In some embodiments, the device may form the timeseries snippets by applying sliding time windows to timeseries of the path metrics for the network path.

At step 1115, as detailed above, the device may extract a plurality of path states from the latent space. In various embodiments, the device may do so by clustering to the latent space.

At step 1120, the device may present the plurality of path states for display by a user interface, as described in greater detail above. In some embodiments, the device may also provide an indication to the user interface of an amount of time the network path exhibits a particular path state.

At step 1125, as detailed above, the device may associate a set of transitions between the plurality of path states with the online application providing degraded application experience. In some embodiments, the device may do so by receiving, from the user interface, an indication that a particular network state is an early sign of application experience provided by the online application becoming degraded. In further embodiments, the device may also use the set of transitions to make a prediction as to when the online application will provide degraded application experience and, in response, cause the traffic for the online application to be rerouted away from the network path. In some embodiments, the device may also receive application experience metrics from the online application and associate the set of transitions between the plurality of path states with the online application providing degraded application experience based in part on the application experience metrics. In one embodiment, the is application experience metrics are based on satisfaction ratings provided by users of the online application. In yet another embodiment, the device may also identify a particular service provider or server associated with the network path and the degraded application experience.

Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for interpreting network path state transitions and characteristics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the is embodiments herein. Therefore, it is the object of the appended claims to cover all such variations and modifications as come within the true spirit and scope of the embodiments herein.

The invention claimed is:

1. A method, comprising:
   forming, by a device, a latent space by applying dimensionality reduction to timeseries snippets of path metrics for a network path via which traffic for an online application is conveyed;
   extracting, by the device, a plurality of path states from the latent space;
   presenting, by the device, the plurality of path states for display by a user interface;
   receiving, at the device and from the user interface, an indication that a particular network state is an early sign of application experience provided by the online application becoming degraded;
   associating, by the device and based on the indication, a set of transitions between the plurality of path states with the online application providing degraded application experience;
   using, by the device, the set of transitions to make a prediction as to when the online application will provide the degraded application experience; and
   causing, by the device and based on the prediction, the traffic for the online application to be rerouted away from the network path.

2. The method as in claim 1, wherein the path metrics comprise at least one of: packet loss, jitter, delay, or throughput.

3. The method as in claim 1, further comprising:
   forming the timeseries snippets by applying sliding time windows to timeseries of the path metrics for the network path.

4. The method as in claim 1, further comprising:
   providing an indication to the user interface of an amount of time the network path exhibits a particular path state.

5. The method as in claim 1, further comprising:
   receiving, at the device and from the online application, application experience metrics, wherein the device associates the set of transitions between the plurality of path states with the online application providing degraded application experience based in part on the application experience metrics.

6. The method as in claim 5, wherein the application experience metrics are based on satisfaction ratings provided by users of the online application.

7. The method as in claim 1, wherein extracting the plurality of path states from the latent space comprises:
   applying, by the device, clustering to the latent space.

8. The method as in claim 1, further comprising:
   identifying, by the device, a particular service provider or server associated with the network path and the degraded application experience.

9. An apparatus, comprising:
   one or more network interfaces;
   a processor coupled to the one or more network interfaces and configured to execute one or more processes; and
   a memory configured to store a process that is executable by the processor, the process when executed configured to:
   form a latent space by applying dimensionality reduction to timeseries snippets of path metrics for a network path via which traffic for an online application is conveyed;
   extract a plurality of path states from the latent space;
   present the plurality of path states for display by a user interface;
   receiving, from the user interface, an indication that a particular network state is an early sign of application experience provided by the online application becoming degraded;
   associate, based on the indication, a set of transitions between the plurality of path states with the online application providing degraded application experience;

use the set of transitions to make a prediction as to when the online application will provide the degraded application experience; and cause, based on the prediction, the traffic for the online application to be rerouted away from the network path.

10. The apparatus as in claim 9, wherein the path metrics comprise at least one of: packet loss, jitter, delay, or throughput.

11. The apparatus as in claim 9, wherein the process when executed is further configured to:

form the timeseries snippets by applying sliding time windows to timeseries of the path metrics for the network path.

12. The apparatus as in claim 9, wherein the process when executed is further configured to:

provide an indication to the user interface of an amount of time the network path exhibits a particular path state.

13. The apparatus as in claim 9, wherein the process when executed is further configured to:

receive, from the online application, application experience metrics, wherein the apparatus associates the set of transitions between the plurality of path states with the online application providing degraded application experience based in part on the application experience metrics.

14. The apparatus as in claim 13, wherein the application experience metrics are based on satisfaction ratings provided by users of the online application.

15. The apparatus as in claim 9, wherein the apparatus extracts the plurality of path states from the latent space by: applying clustering to the latent space.

16. A tangible, non-transitory, computer-readable medium storing program instructions that, when executed by a device, cause the device to execute a process comprising:

forming, by the device, a latent space by applying dimensionality reduction to timeseries snippets of path metrics for a network path via which traffic for an online application is conveyed;

extracting, by the device, a plurality of path states from the latent space;

presenting, by the device, the plurality of path states for display by a user interface;

receiving, at the device and from the user interface, an indication that a particular network state is an early sign of application experience provided by the online application becoming degraded;

associating, by the device and based on the indication, a set of transitions between the plurality of path states with the online application providing degraded application experience;

using, by the device, the set of transitions to make a prediction as to when the online application will provide the degraded application experience; and causing, by the device and based on the prediction, the traffic for the online application to be rerouted away from the network path.

\* \* \* \* \*

UNITED STATES PATENT AND TRADEMARK OFFICE
CERTIFICATE OF CORRECTION

PATENT NO. : 12,068,946 B2
APPLICATION NO. : 17/982957
DATED : August 20, 2024
INVENTOR(S) : Mukund Yelahanka Raghuprasad et al.

It is certified that error appears in the above-identified patent and that said Letters Patent is hereby corrected as shown below:

In the Specification

Column 9, Line 67 should read:
application telemetry (e.g., from routers 110*a*-110*b*, SD- Column 10, Line 46 should read:
characterizing the states for that metric. Furthermore, there Column 11, Line 18 should read:
the processor 220 (or independent processor of interfaces Column 11, Line 51 should read:
248 may include any or all of the following components:

Column 12, Line 25 should read:
takes in as input all of the path metrics 512 for a given Column 12, Line 66 should read:
containing both network-level and application-level met- Column 14, Line 13 should read:
regions are very close to each other. If the user finds that Column 14, Line 54 should read:
identified through system logs. Such latent space regions Column 16, Line 3 should read:
application experience, network state dynamics interpreter Signed and Sealed this
Twenty-sixth Day of November, 2024

Katherine Kelly Vidal
*Director of the United States Patent and Trademark Office*

CERTIFICATE OF CORRECTION (continued)
U.S. Pat. No. 12,068,946 B2

Column 16, Line 25 should read:
network path that constitute such transitions. More Column 16, Line 45 should read:
controller for a network (e.g., an SDN controller, a Column 17, Line 18 should read:
one embodiment, the application experience metrics are Column 17, Line 57 should read:
embodiments herein. Therefore, it is the object of the